United States Patent
Gutarin et al.

(10) Patent No.: US 8,589,580 B2
(45) Date of Patent: Nov. 19, 2013

(54) METHOD AND APPARATUS FOR GEOFILTERING BY CONTENT

(75) Inventors: Alexander V. Gutarin, Beverly Hills, CA (US); Andrew Sadique Imam, North Hollywood, CA (US)

(73) Assignee: Hulu, LLC, Santa Monica, CA (US)

( * ) Notice: Subject to any disclaimer, the term of this patent is extended or adjusted under 35 U.S.C. 154(b) by 268 days.

(21) Appl. No.: 12/981,194

(22) Filed: Dec. 29, 2010

(65) Prior Publication Data

US 2011/0320628 A1     Dec. 29, 2011

Related U.S. Application Data

(60) Provisional application No. 61/359,245, filed on Jun. 28, 2010.

(51) Int. Cl.
*G06F 15/16* (2006.01)
(52) U.S. Cl.
USPC ............................... 709/231; 725/56; 725/57
(58) Field of Classification Search
USPC ......................................................... 709/231
See application file for complete search history.

(56) References Cited

U.S. PATENT DOCUMENTS

| | | | |
|---|---|---|---|
| 6,684,250 B2 | 1/2004 | Anderson et al. | |
| 8,131,585 B2* | 3/2012 | Nicholas et al. | 705/14.26 |
| 2004/0078367 A1 | 4/2004 | Anderson et al. | |
| 2005/0015719 A1* | 1/2005 | Marchon et al. | 715/513 |
| 2007/0157228 A1 | 7/2007 | Bayer et al. | |
| 2009/0176580 A1 | 7/2009 | Hermann et al. | |
| 2010/0011391 A1 | 1/2010 | Carpenter et al. | |
| 2010/0235394 A1* | 9/2010 | Sukanen et al. | 707/782 |
| 2010/0318628 A1 | 12/2010 | Pacella et al. | |

OTHER PUBLICATIONS

International Search Report, PCT Application No. PCT/US2011/041891, mailed Oct. 27, 2011.

\* cited by examiner

*Primary Examiner* — Tauqir Hussain
(74) *Attorney, Agent, or Firm* — Fountainhead Law Group P.C.

(57) ABSTRACT

Methods, apparatuses, articles of manufacture, and memory structures for selective delivery of content based on geolocation are disclosed.

20 Claims, 5 Drawing Sheets

METHOD AND APPARATUS FOR GEOFILTERING BY CONTENT

CROSS REFERENCE TO RELATED APPLICATIONS

This application claims the benefit under 35 U.S.C. Section 119(e) of the following co-pending and commonly-assigned application:

U.S. Provisional Application Ser. No. 61/359,245, filed on Jun. 28, 2010, by Alexander V. Gutarin et al., entitled "METHOD AND APPARATUS FOR GEOFILTERING BY CONTENT,"

which application is incorporated by reference herein.

BACKGROUND OF THE INVENTION

1. Field of the Invention

The present invention relates to systems and methods for providing streaming media to users, and in particular, to a system and method for filtering the streaming media by geolocation.

2. Description of the Related Art

The dissemination and playback of media programs (content) has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and/or satellite). These methods of dissemination and playback has become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed connection. Such downloading is typically performed by a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has been downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user will have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

The advent of internet delivery of content has had a profound effect upon the distribution of content. Some content is geographically limited in terms of distribution, for royalty and/or piracy reasons, and to control distribution of content has become difficult because of the ease of access to the internet from computers, satellites, and mobile devices world wide.

What is needed is a method and apparatus that provides selective delivery of content based on where users are and the restrictions placed on content delivery. The present invention satisfies that need.

SUMMARY OF THE INVENTION

To address the requirements described above, a method, apparatus, article of manufacture, and a memory structure for selectively providing content from a media program provider to a user device. A method in accordance with one or more embodiments of the present invention, wherein the user device comprises a user interface module and a media program player, bases the selective providing of the content on a geolocation of the user device, and comprises requesting, from the user interface module of the user device, a program identifier (PID) for content from the media program provider, wherein the PID request for content comprises at least a geolocation component, determining if the requested PID is geographically restricted, determining a geolocation of the user device based at least on the geolocation component of the PID request for content, and selectively providing access to the requested content based on a comparison between geographic restrictions of the PID and the determined geolocation of the user device.

Such a method further optionally comprises the selectively provided access further comprising a time component, wherein access to the requested content is based on a time of requesting the PID for the content, the selectively provided access to the requested content further comprising providing a token to the user device, selectively providing access to the requested content further comprising requesting from the media program player of the user device a location of the requested content and providing the location of the requested content based on the request from the media program player including the token provided to the user device, requesting the content at the provided location and providing the requested content at the provided location when the request for the content at the provided location includes the token provided to the user device, requiring that the token provided to the user device is used to decode the requested content, and the geographic restrictions comprising country codes.

An apparatus for selectively providing content from a media program provider to a user device comprising a user interface module and a media program player, wherein the content is selectively provided based on a geolocation of the user device in accordance with one or more embodiments of the present invention comprises means for requesting a program identifier (PID) for content from the media program provider, wherein the PID request for content comprises at least a geolocation component, means for determining if the requested PID is geographically restricted, means for determining a geolocation of the user device based at least on the geolocation component of the PID request for content, and means for selectively providing access to the requested content based on a comparison between geographic restrictions of the PID and the determined geolocation of the user device.

Such an apparatus further optionally comprises the PID request for content further comprising a time component, wherein access to the requested content is based on a time of requesting the PID for the content, the means for selectively providing access to the requested content further comprising means for providing a token to the user device, the means for selectively providing access to the requested content further comprising means for requesting a location of the requested content and means for providing the location of the requested content based on the request from the media program player including the token provided to the user device, means for requesting the content at the provided location and means for providing the requested content at the provided location when the request for the content at the provided location includes the token provided to the user device, requiring that the token provided to the user device is used to decode the requested content, and the geographic restrictions comprising country codes.

An apparatus for selectively providing content from a media program provider based on a geolocation of a request for the content in accordance with one or more embodiments of the present invention comprises a geocheck module, a restriction database, coupled to the geocheck module, and a feed service module, coupled to the restriction database, wherein a program identifier (PID) for content is provided from the feed service with a feed service token, the feed service token having a geographical restriction, and the media program provider providing the content associated with the PID with the feed service token only when a geolocation of a requesting user device meets the geographical restriction of the feed service token.

Such an apparatus further optionally comprises the PID for content further comprising a time component, wherein access to the requested content is restricted based on a time stamp in the PID associated with the content, a content selector, coupled to the feed service and a media server, coupled to the content selector, wherein the media server delivers the content based on a video token being provided to the media server substantially matching the feed service token, requiring the feed service token be used to decode the requested content, and the geographic restrictions comprising country codes.

A further understanding of the nature and details of the present invention may be realized by reference to the remaining portions of the specifications and drawings. The preferred embodiments of this invention are described below to further clarify the structure and method for achieving said invention.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
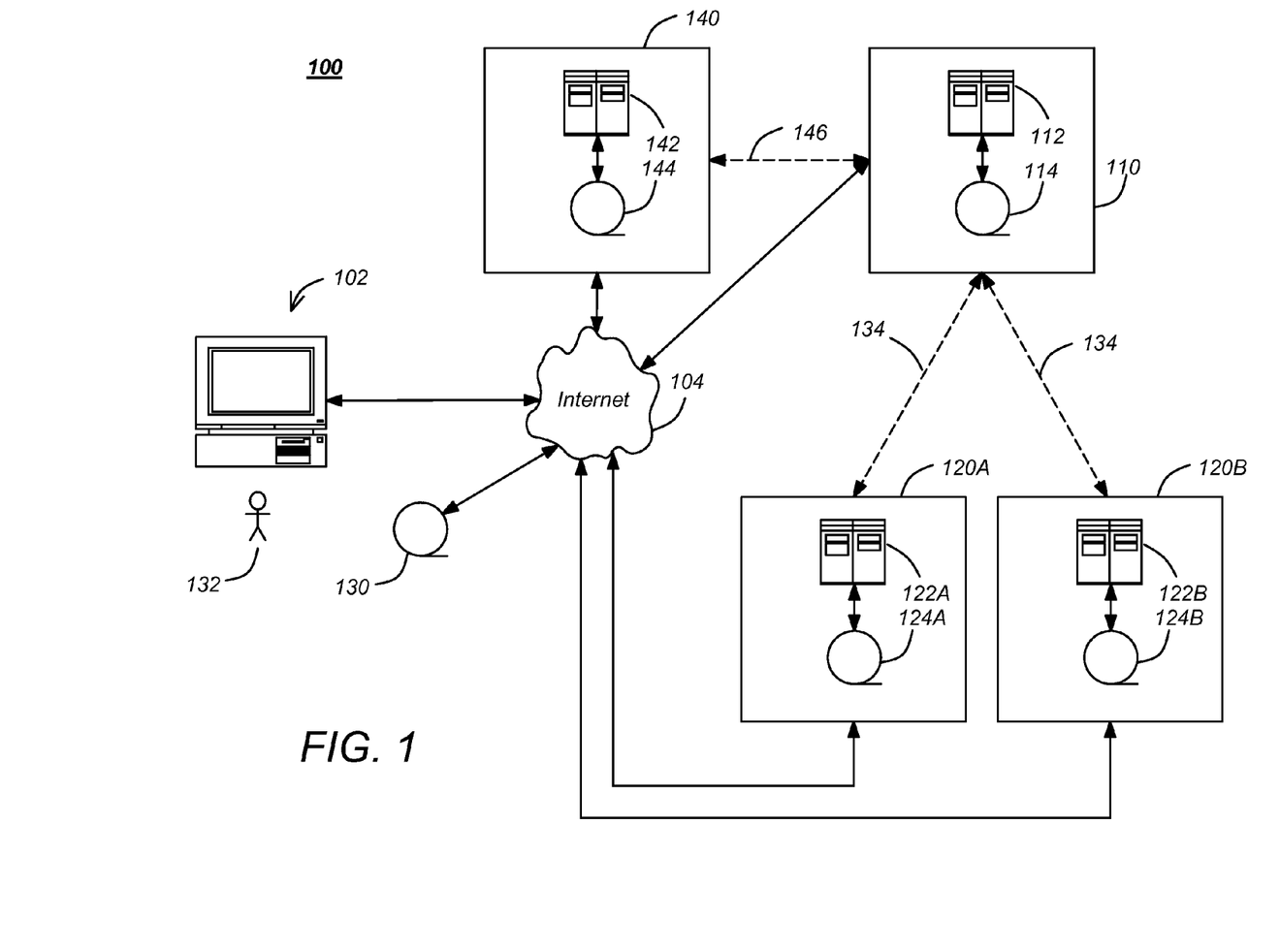
FIG. 1 is a diagram illustrating an exemplary media program system.

FIG. 1 is a diagram illustrating an exemplary media program system 100. In the illustrated embodiment, the system 100 may comprise one or more media program (content) sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 may stream media programs to the user's computer 102 directly from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user's computer 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the computer 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user computer 102 at the appropriate time.

In one embodiment, the advertisements are integrated with the streamed or downloaded video from the media program provider 110. In another embodiment, the advertisements are not integrated with the media program, but are instead transmitted to the user computer 102 separately from the media program, and replayed at the appropriate time using indices that indicate when each advertisement should be presented. For example, advertisements can be indexed and streamed or downloaded to the user computer 102 (from the media program provider 110 or the advertisement provider 140), and such advertisements can be played back to the user 132 at times indicated by corresponding indices in the media program.

Computer System Overview

Figure 2:
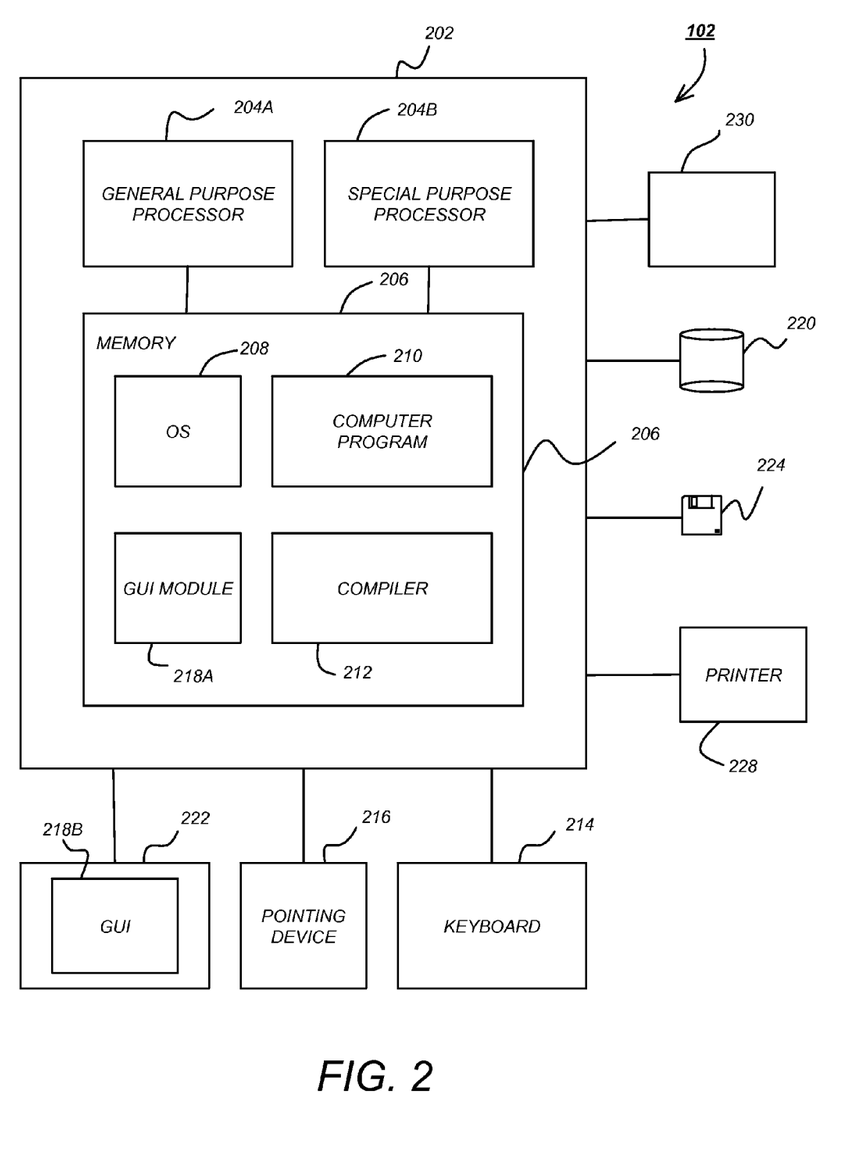
FIG. 2 illustrates an exemplary computer system that could be used to implement the present invention.

FIG. 2 illustrates an exemplary computer system 202 that could be used to implement elements of the present invention, including the user computer 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, some or all of the computer program 210 instructions may be implemented via firmware instructions stored in a read only memory (ROM), a programmable read only memory (PROM) or flash memory in within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" is referred to herein, it is understood that a user computer 102 may include portable devices such as cellphones, portable MP3 players, video game consoles, notebook computers, pocket computers, personal data assistants (PDAs) or any other device with suitable processing, communication, and input/output capability.

Content Delivery System

Figure 3:
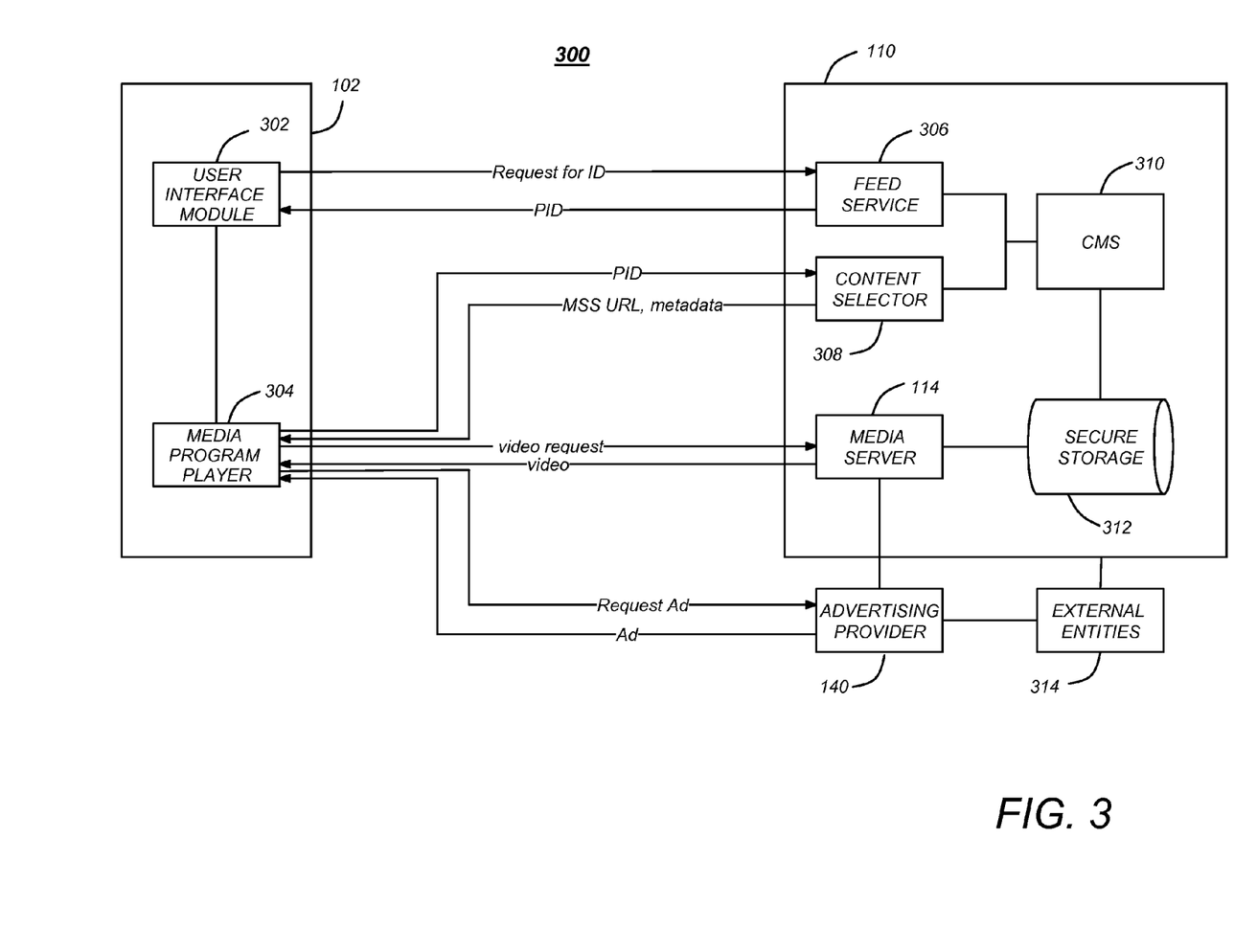
FIG. 3 is a diagram illustrating a content delivery subsystem and top-level operations that can be used to deliver media programs and advertisements for presentation to a user.

FIG. 3 is a diagram illustrating a content delivery subsystem (CDS) 300 and top-level operations that can be used to deliver media programs and advertisements for presentation to a user 132. In this embodiment, the content delivery subsystem 300 includes the user computer 102, the media program provider 110, and an advertisement provider 140. Although the advertisement provider 140 is illustrated as a separate architectural entity than the media program provider 110, the advertisement provider 140 may be integrated within the media program provider 110. The CDS 300 provides a means to provide media programs and advertisements across a plurality of distribution networks, which may include www.hulu.com, www.imdb.com, www.aol.com or www.m-sn.com. Metadata related to media program and advertisement content is stored in the content delivery system 300, as is data describing where the media programs and advertisements may be found within the CDS 300.

The user computer 102 includes an interface module 302 and a media program player 304. The interface module 302 includes instructions performed by the user computer 102 that are used to present information to the user 132 and to accept user input, including commands. The presented information may include a program guide, advertisement options, and the user input may include selected advertisement options and media program playback selections.

Using the user computer 102 and the interface module 302, the user 132 enters a choice for a media program. The user interface module 302 transmits a request message to a feed service 306 implemented by the media program provider 110 for a program identifier (PID). The PID is used to identify content such as a specific media program running on a specific distribution network. For example, season 2 of "The Office" running on www.hulu.com will have a different PID than the same exact show running on www.msn.com.

The feed service 306 then returns the PID to the user interface module 302. The PID and associated commands (e.g. the play command) are provided to the media program player 304. The media program player 304 may be embedded in a webpage from a third party, or may be part of a webpage maintained by the media program provider 110, or may be implemented in a standalone application.

The media program player 304 transmits the PID to a content selector 308 implemented by the media program provider 110. The content selector 308 identifies the actual path (uniform resource locator or URL, for example) to the requested media program associated with the transmitted PID, as well as programming metadata that is used by the media program player 304 to help identify restrictions (for example, preventing access to adult-themed content if the user 132 is known to be under 18), advertising targeting rules as well as advertising breaks. The advertising breaks indicate where advertisements may be inserted, and can be specified in terms of the time since the beginning of the media program, the time remaining, or any other suitable measure. The URL and the metadata are then transmitted to the media program player 304. The media program player provides a video request to the media server 114 at the URL received from the content selector 308. The video request includes the PID and may include other information as well. The video request may be for streaming or progressively downloading the requested media program.

The media streaming server (MSS) 114 responds to the video request by providing the media program to the user computer 102. In one embodiment, the MSS 114 is a service provider that has a wide range of geographically distributed computers that store replicated copies of media programs and website content. The MSS 114 can be a third party provider (e.g. only contractually associated with the media program provider 110), or can be part of the media program provider 110. Geographically diverse servers assures that when the user 132 requests playback of a media program, the media program is streamed from a geographically local server, to increase media program playback performance. Multiple servers also offer redundancy.

The MSS 114 obtains the media program from secure storage 312 which may be disposed in the media program provider 110 facility, or which may be disposed at a third party facility. The content management service 310 interfaces with the feed service 306, the content selector 308, and secure storage 312 to manage which media programs are provided to the media server 114. External entities 314 can include third parties such entities that provide the advertisements that are to be displayed to the user (which includes sponsors and/or their advertising agencies), third party providers of media programs, and entities from which the user 132 may purchase goods or services as further described below.

The media program is transmitted to the media program player 304. As described above, the media program may be streamed or progressively downloaded to the media program player 304. In one embodiment, the media program player 304 plays the media program, and at the times identified in the advertising breaks defined above, requests advertisements from the advertising provider 140 using a path (e.g. URL) provided either by the content selector 308 or the media streaming server 114. The advertising provider 140 streams the requested advertisement is streamed to the media program player 304 at the appropriate time, where it is displayed to the user 132. In another embodiment, the media server 114 obtains the advertisements from the advertising provider 140 and inserts the advertisements in the media program before the media program is streamed or progressively downloaded to the media program player 304.

Geofiltering Content

Figure 4:
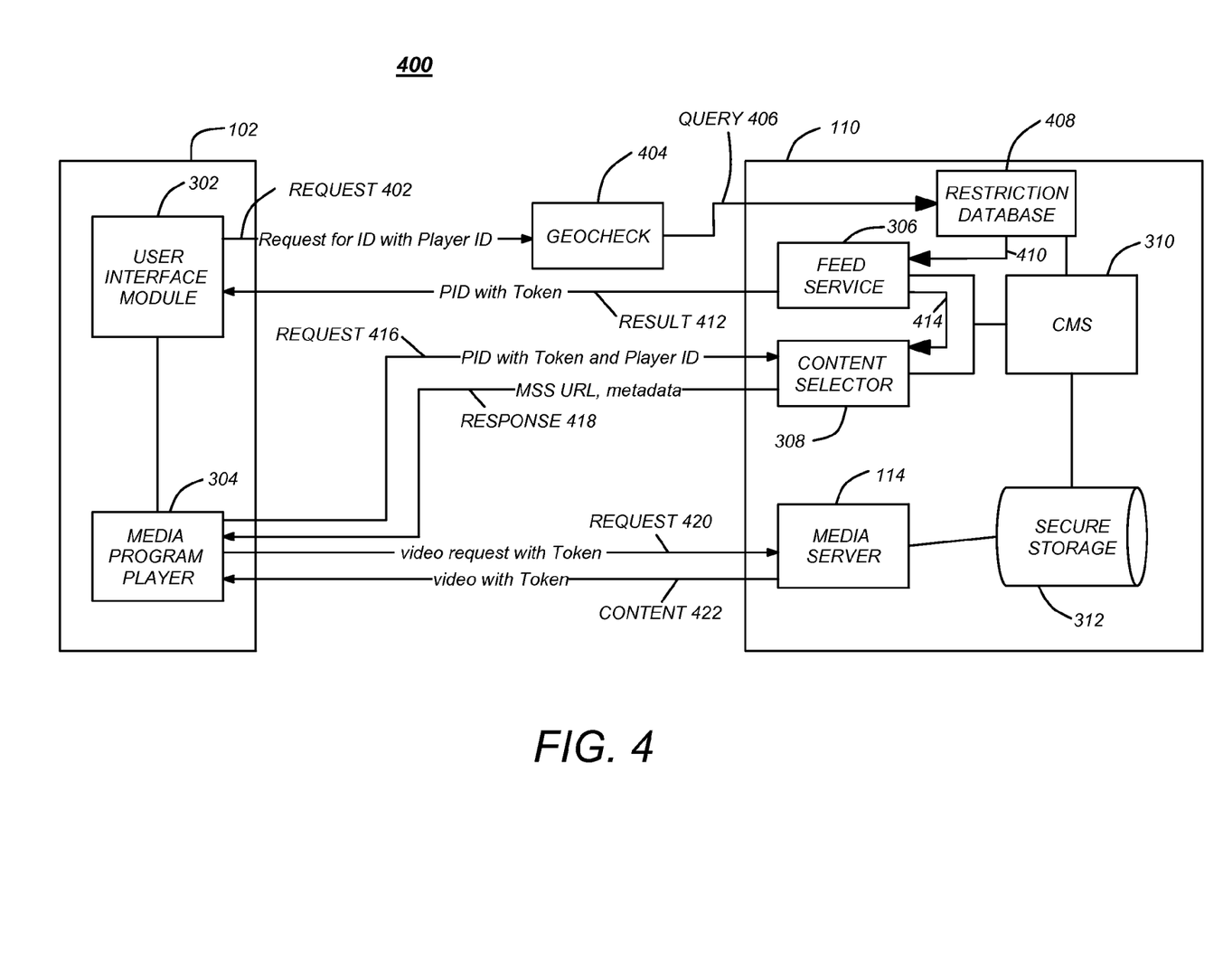
FIG. 4 is a diagram illustrating a content delivery subsystem (CDS) 400 and top-level operations in accordance with one or more embodiments of the present invention.

FIG. 4 is a diagram illustrating a content delivery subsystem (CDS) 400 and top-level operations that can be used to deliver media programs based on geographic location of the user computer 102.

User interface module 302 makes a request 402 for a media program. The user interface module 302 transmits this request as in FIG. 3, however, in the present invention, the request 402 includes a user computer's 102 identifier, i.e., the Internet Protocol (IP) address where the user computer 102 accessed the internet, which indicates the country where the user computer 102 is located. The user computer 102 identifier can contain other information, e.g., a serial number of the user computer 102, Global Positioning System (GPS) information indicating the location of user computer 102, etc., in order to further identify the user computer 102 and the geolocation of user computer 102.

Further, the request 402 is sent to a geolocation checking module 404, also referred to as a geocheck module 404, which sends a query 406 to a restriction database 408 to determine, given the program ID and the user computer 102 location, whether the program ID that was requested by the user computer 102 can be delivered to the user computer 102 at the location user computer 102 is located. For example, and not by way of limitation, user computer 102 may normally be located in the United States, and normally accesses the internet via an IP address that is located in the United States, e.g., 192 0.0 0.2 0.234. That user computer 102 would make a request to geocheck module 404 for a specific program, e.g., an episode of "House MD," and geocheck module 404 would send a query 406 to restriction database 408 to see if the request to deliver that episode to a computer 102 located in the United States is permitted within system 400.

Restriction database 408 stores any geographical restrictions, such as country codes, restricted internet access addresses, etc., as well as any other restrictions, for delivery of content data within system 400. Although shown as part of media program provider 110, restriction database 408 can reside outside media program provider 110, and although shown as outside of media program provider 110, geocheck module 404 can reside within media program provider 110 as desired.

Continuing with the example above, restriction database 408 then runs query 406 to see if the requested episode of "House MD" has any geographical restrictions related to content delivery, and returns a result 410 to feed service 306. For this example, the requested episode of "House MD" has a geographical restriction in that the requested episode cannot be delivered to Russia, Asia, or European countries. Since the user computer 102 is located in the United States, based on the IP address sent from user computer 102 as part of request 402 and used as part of the query 406, restriction database 408 would indicate in result 410, in the present example, that delivery of the requested episode of "House MD" is allowed, and would indicate result 410 to feed service 306.

Changes can be made to the restriction database 408 that could change the restrictions placed on any particular content or all content, and the results of the query can be different based on the geographical location of the request 402. For example, and not by way of limitation, a query 406 from a computer 102 in the United States could return a result that indicates it is allowable to deliver the content for free; a query 406 from a computer 102 in Europe could return a result that indicates it is allowable to deliver the same content for a fee; and a query 406 from a computer in China could return a result that it is not allowable to deliver the same content under any circumstances. At some time in the future, the same content may have different restrictions, such that that content can be delivered to any computer, or that the content can be delivered to computers 102 in Europe without charge instead of for a fee, etc.

The result 410 is delivered to feed service 306, which returns a Program ID (PID) and a token (also called the "feed service token") or other unique indicia back to user computer 102 as result 412. The token which is attached to the PID is also sent to content selector 308, such that content selector has knowledge of the requesting user computer 102. User interface module 302 forwards the token or other unique indicia to media program player 304.

When media program player 304 makes a PID request 416, the token assigned by feed service 306 and/or restriction database 408 is included in request 416, as well as an identifier for the media program player/user computer 102. If request 416 does not have the same token as provided by user interface module 302, content selector 308 will not process the request 416, and will not return response 418, which contains the media selection server URL and metadata necessary for user computer 102 to locate and stream the requested content. If the user computer 102 identifier does not match the player ID used in request 402, again, content selector 308 can refuse to return response 418. Of course, request 416 may have a different user computer 102 location and/or player ID, because user computer 102 may be a mobile device and has a new network access point, etc. Such determinations can be made within media program provider 110 via feed service 306, content selector 308, restriction database 408, or other portions of the media program provider 110 as desired.

If desired, content selector 308 can return a different response 418 to user computer 102, e.g., that the requested content is not available, that the requested content is restricted, etc., or response 418 can request further information from user computer 102 to provide additional information about user computer 102 such that request 402 and query 406 can be repeated to obtain a different result 412.

Once media program provider 110 has received a request 416 with a token or other unique indicia that matches the initial request 402, the response 418 can be provided to user computer 102 such that request 420 can be made, which allows user computer 102 to access media server 114 at the proper address (URL) to receive content 422. Again, the request 420 and content 422 contain the token (which can also be a different token, or "video token") or other unique indicia that have been used in system 400 for the user computer 102, such that media program player 304 must have knowledge of the feed service token used for the request 416 to be able to decode and play the content 422 and the video token and feed service tokens must substantially match for the content 422 to be decoded.

Such exchange of the information contained within the token or other unique indicia that started with user interface module 302 and must be resident in or accessible to media program player 304 prevents a "proxy" computer 102 which would be resident in a first geographic location, e.g., the United States, from making a proper request 402, receiving clearance from geocheck module 404 and restriction database 408, receiving the PID result 412, and merely forwarding the PID result to another computer 102 that is located in a second geographic location that would not have received clearance from geocheck module 404. Thus, the present invention provides means for ensuring that the content 422 is delivered to a user computer 102 that is located in a geographic area authorized to receive the content 422 that was requested via request 402.

An attempt to avoid geocheck module 404 typically attempts to use a proxy computer 102 located in an authorized country, e.g., the United States, to get permission to play the video content 422. Such attempts are typically allowed for HTTP internet traffic since the amount of traffic is small and the files are relatively small in data size, but is much more expensive when used with RTMP streaming video traffic. Thus, it is important for the geocheck module 404 to ensure that both the IP reported by the client 102 to the geo-check service and IP reported by the client 102 to the media server 114 belong to a country for which video playback is allowed.

For example, when the client 102 requests permission from the geo-check service via request 402, the geo-check service module 404 resolves the client 102 IP to a country and checks that country against the allow list stored in the restriction database 408. If playback is permitted, the geo-check service 404 constructs a geo-check token, that is used later on to validate client 102 IP reported by the media server 114. The token is appended to the media stream URI and typically contains, in encrypted form, a list of allowed countries (so that the geo-check 404 does not have to query the restriction database 408 during the second check, part of the media stream URI so that the second request can be validated against the token, and an expiration time for the token.

When the user computer 102 requests the stream from the third-party media server 114, the media server 114 makes another call to the geo-check service 404. The call typically contains the following information, typically in encrypted form: a media stream URI, which contains the geo-check token, the client 102 IP that was reported by the client 102 to the media server 114, which can be different from the IP from before.

The geo-check service 404 then receives the call from the media server 114, decrypts the token, and returns an allow or deny request to the media server 114 based on the following conditions: the client 102 IP reported by media server 114 matches a country included into the allow list encrypted into the token, the media stream URI components encrypted in the geo-check token match the URI components from the URI that was used to request the stream, and the Geo-check token has not expired (i.e., the request has occurred prior to the expiration time of the geo-check token).

The "token" or other unique indicia is used to indicate, among other things, country codes that are allowable for a given content, the stream URL, and can also indicate an expiration time for a given request 402/416. So, for example, to prevent a user computer 102 from obtaining the URL in response 418 for content requested in request 402 when the user computer 102 made the request at some time in the past, and now may be in a geolocation that would be unauthorized or the token has expired based on elapsed time. Thus, the token can have the encoded restrictions on content delivery, as well as a time stamp or other indicator to indicate the time that the token was issued by media program provider 110.

Process Chart

Figure 5:
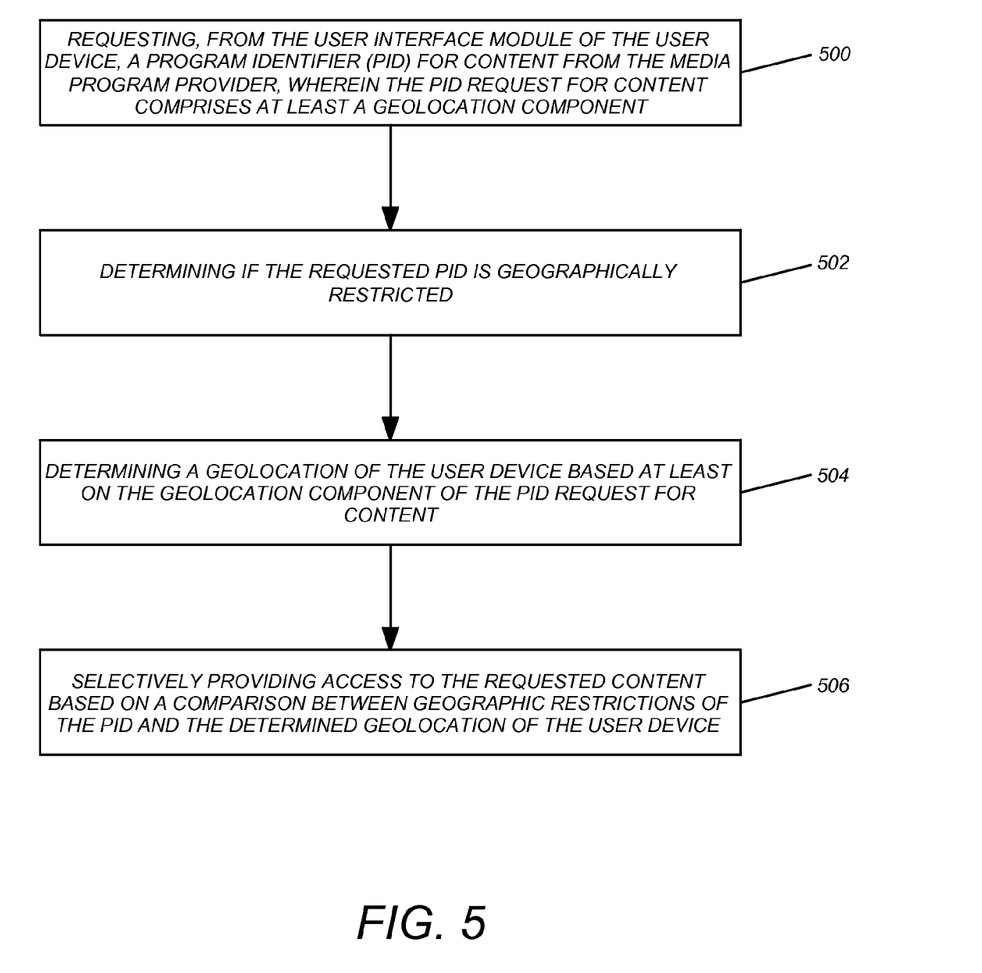
FIG. 5 illustrates a process chart indicating process steps embodying one or more embodiments of the present invention.

FIG. 5 illustrates a process chart indicating process steps embodying one or more embodiments of the present invention.

Box 500 illustrates requesting, from the user interface module of the user device, a program identifier (PID) for content from the media program provider, wherein the PID request for content comprises at least a geolocation component.

Box 502 illustrates determining if the requested PID is geographically restricted.

Box 504 illustrates determining a geolocation of the user device based at least on the geolocation component of the PID request for content.

Box 506 illustrates selectively providing access to the requested content based on a comparison between geographic restrictions of the PID and the determined geolocation of the user device.

Conclusion

In summary, the present invention describes methods and apparatuses for selectively providing content from a media program provider to a user device. A method in accordance with one or more embodiments of the present invention, wherein the user device comprises a user interface module and a media program player, bases the selective providing of the content on a geolocation of the user device, and comprises requesting, from the user interface module of the user device, a program identifier (PID) for content from the media program provider, wherein the PID request for content comprises at least a geolocation component, determining if the requested PID is geographically restricted, determining a geolocation of the user device based at least on the geolocation component of the PID request for content, and selectively providing access to the requested content based on a comparison between geographic restrictions of the PID and the determined geolocation of the user device.

Such a method further optionally comprises the selectively provided access further comprising a time component, wherein access to the requested content is based on a time of requesting the PID for the content, the selectively provided access to the requested content further comprising providing a token to the user device, selectively providing access to the requested content further comprising requesting from the media program player of the user device a location of the requested content and providing the location of the requested content based on the request from the media program player including the token provided to the user device, requesting the content at the provided location and providing the requested content at the provided location when the request for the content at the provided location includes the token provided to the user device, requiring that the token provided to the user device is used to decode the requested content, and the geographic restrictions comprising country codes.

An apparatus for selectively providing content from a media program provider to a user device comprising a user interface module and a media program player, wherein the content is selectively provided based on a geolocation of the user device in accordance with one or more embodiments of the present invention comprises means for requesting a program identifier (PID) for content from the media program provider, wherein the PID request for content comprises at least a geolocation component, means for determining if the requested PID is geographically restricted, means for determining a geolocation of the user device based at least on the geolocation component of the PID request for content, and means for selectively providing access to the requested content based on a comparison between geographic restrictions of the PID and the determined geolocation of the user device.

Such an apparatus further optionally comprises the PID request for content further comprising a time component, wherein access to the requested content is based on a time of requesting the PID for the content, the means for selectively providing access to the requested content further comprising means for providing a token to the user device, the means for selectively providing access to the requested content further comprising means for requesting a location of the requested content and means for providing the location of the requested content based on the request from the media program player including the token provided to the user device, means for requesting the content at the provided location and means for providing the requested content at the provided location when the request for the content at the provided location includes the token provided to the user device, requiring that the token provided to the user device is used to decode the requested content, and the geographic restrictions comprising country codes.

An apparatus for selectively providing content from a media program provider based on a geolocation of a request for the content in accordance with one or more embodiments of the present invention comprises a geocheck module, a restriction database, coupled to the geocheck module, and a feed service module, coupled to the restriction database, wherein a program identifier (PID) for content is provided from the feed service with a feed service token, the feed service token having a geographical restriction, and the media program provider providing the content associated with the PID with the feed service token only when a geolocation of a requesting user device meets the geographical restriction of the feed service token.

Such an apparatus further optionally comprises the PID for content further comprising a time component, wherein access to the requested content is restricted based on a time stamp in the PID associated with the content, a content selector, coupled to the feed service and a media server, coupled to the content selector, wherein the media server delivers the content based on a video token being provided to the media server substantially matching the feed service token, requiring the feed service token be used to decode the requested content, and the geographic restrictions comprising country codes.

Those skilled in the art will recognize many modifications may be made to this configuration without departing from the scope of the present invention. For example, those skilled in the art will recognize that any combination of the above components, or any number of different components, peripherals, and other devices, may be used with the present invention. This concludes the description of the preferred embodiments of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of selectively providing content from a media program provider to a user device comprising a user interface module and a media program player, comprising:

receiving, from the media program player of the user device, a program identifier (PID) request for content at the media program provider, wherein the PID request for content comprises at least a geolocation component based on a geolocation of the user device and a token that was generated based on a geolocation restriction request by the user interface module, and wherein the token was provided to the user interface module upon verification of the geolocation restriction request and the user interface module provided the token to the media program player;

verifying that the token included in the PID request matches a token stored by the media program provider, wherein the token was provided to the media program provider in response to processing of the geolocation restriction request;

when verified, performing:
  determining if the content associated with the PID request is geographically restricted;
  determining the geolocation of the user device based at least on the geolocation component of the PID request for content; and
  selectively providing access to the requested content based on a comparison between geographic restrictions of the content associated with the PID request and the determined geolocation of the user device; and when not verified, not providing access to the requested content.

2. The method of claim 1, wherein verifying further comprises verifying a time component, wherein access to the requested content is based on a time associated with the PID request for the content.

3. The method of claim 1, further comprising providing the token to the user interface module.

4. The method of claim 3, wherein selectively providing access to the requested content further comprises:
  determining an access location of the requested content; and
  providing the access location of the requested content to the media player based on the verifying of the PID request and the comparison between geographic restrictions of the content and the determined geolocation of the user device.

5. The method of claim 4, wherein selectively providing access comprises:
  receiving an access request for the content at the access location; and
  providing the requested content from the provided location when the access request for the content at the access location includes the token provided to the user interface module.

6. The method of claim 5, further comprising requiring that the token provided to the user interface module is used to decode the requested content.

7. The method of claim 1, wherein the geographic restrictions comprise country codes.

8. An apparatus for selectively providing content from a media program provider to a user device comprising a user interface module and a media program player, comprising:
  one or more computer processors; and
  a non-transitory computer-readable storage medium comprising instructions, that when executed, control the one or more computer processors to be configured for:
  receiving, from the media program player of the user device, a program identifier (PID) request for content at the media program provider, wherein the PID request for content comprises at least a geolocation component based on a geolocation of the user device and a token that was generated based on a geolocation restriction request by the user interface module, and wherein the token was provided to the user interface module upon verification of the geolocation restriction request and the user interface module provided the token to the media program player;

verifying that the token included in the PID request matches a token stored by the media program provider, wherein the token was provided to the media program provider in response to processing of the geolocation restriction request;

when verified, performing:
  determining if the content associated with the PID request is geographically restricted;
  determining the geolocation of the user device based at least on the geolocation component of the PID request for content; and
  selectively providing access to the requested content based on a comparison between geographic restrictions of the content and the determined geolocation of the user device; and when not verified, not providing access to the requested content.

9. The apparatus of claim 8, wherein verifying further comprises verifying a time component, wherein access to the requested content is based on a time associated with the PID request for the content.

10. The apparatus of claim 8, wherein verifying further comprises providing the token to the user interface module.

11. The apparatus of claim 10, wherein selectively providing access to the requested content further comprises:
  determining an access location of the requested content; and
  providing the access location of the requested content to the media player based on the verifying of the PID request and the comparison between geographic restrictions of the content and the determined geolocation of the user device.

12. The apparatus of claim 11, wherein selectively providing access comprises:
  receiving an access request for the content at the access location; and
  providing the requested content from the access location when the access request for the content at the access location includes the token provided to the user interface module.

13. The apparatus of claim 12, further comprising requiring that the token provided to the user interface module is used to decode the requested content.

14. The apparatus of claim 8, wherein the geographic restrictions comprise country codes.

15. The method of claim 1, wherein the geolocation comprises a first geolocation, the method further comprising:
  processing the geolocation restriction request sent by the user interface module; and
  determining whether a second geolocation of the user device when the geolocation restriction request was sent complies with geographical restrictions on the content; and
  if the second geolocation complies, then sending the token to the user interface module and sending the token to the media program provider.

16. The method of claim 1, wherein the token comprises the geographical restrictions used in selectively providing access.

17. A method comprising:
  sending, by a user interface module in a user device, a geolocation restriction request for content including a first location of the user device;

receiving, by the user interface module, a token based on verifying of the first location of the user device and geographical restrictions for the content;

providing, by the user interface module, the token to a media program player of the user device;

sending, from the media program player of the user device, a program identifier (PID) request for the content to a media program provider, wherein the PID request for content comprises at least a geolocation component based on a second location of the user device and the token received from the user interface module; and receiving access to the content if the media program provider verifies that the token included in the PID request matches a token stored by the media program provider, wherein the token was provided to the media program provider in response to processing of the geolocation restriction request, and wherein the second location of the user device is not restricted based on geographic restrictions of the content.

18. The method of claim 17, wherein receiving access comprises:

receiving an access location of the requested content based on the verifying of the PID request.

19. The method of claim 18, further comprising sending an access request for the content to the access location, the access request including the token.

20. The method of claim 19, further comprising receiving the content from the access location when the token is verified.

* * * * *